No. 659,379. Patented Oct. 9, 1900.
W. S. ROGERS & L. S. CHADWICK.
CLUTCH.
(Application filed Feb. 8, 1900.)
(No Model.)

Witnesses:
E. R. Shipley
M. S. Belden

Winfield S. Rogers
Lee S. Chadwick
Inventors
by James W. See
Attorney

UNITED STATES PATENT OFFICE.

WINFIELD S. ROGERS AND LEE S. CHADWICK, OF BOSTON, MASSACHUSETTS; SAID ROGERS ASSIGNOR TO SAID CHADWICK.

CLUTCH.

SPECIFICATION forming part of Letters Patent No. 659,379, dated October 9, 1900.

Application filed February 8, 1900. Serial No. 4,435. (No model.)

*To all whom it may concern:*

Be it known that we, WINFIELD S. ROGERS, of Boston, Suffolk county, Massachusetts, (post-office address care Ball Bearing Co., Boston, Massachusetts,) and LEE S. CHADWICK, of Boston, Suffolk county, Massachusetts, (post-office address Boston, Massachusetts,) citizens of the United States, have invented certain new and useful Improvements in Devices for Transmitting Rotary Motion, of which the following is a specification.

This invention pertains to a device for transmitting rotary motion in cases where the driver is to drive the driven in either direction, according to which way the driver is turning, and the driven is to be capable of turning while the driver is at rest or capable of turning in advance of the driver when the driver is in motion. An appreciation of the conditions satisfied by the invention may be had in view of the motor-driven vehicle, in which two driven wheels upon one axle are to turn at different rates as the vehicle rounds a corner. In such case when our invention is employed the driver may transmit motion to that vehicle-wheel running in the shorter curve, the wheel running in the longer curve rolling faster than its fellow.

Our invention will be readily understood from the following description, taken in connection with the accompanying drawings, in which—

Figure 1:
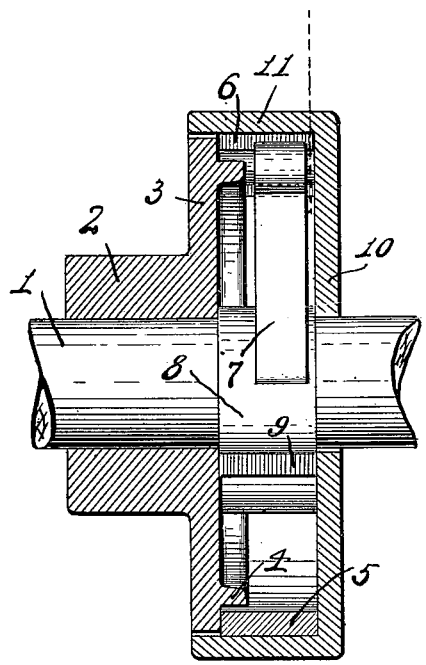
Figure 2:
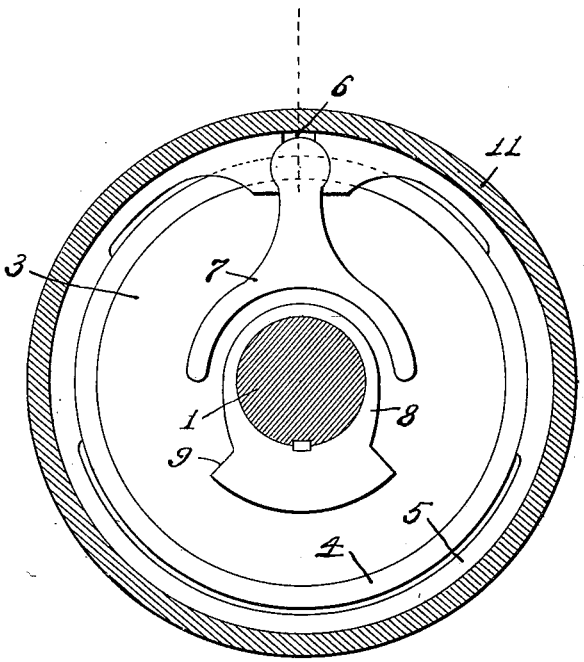

Figure 1 is a vertical diametrical section of a device exemplifying our invention, and Fig. 2 a vertical section of the same in a plane at right angles to the axis of the device.

In the drawings, 1 indicates a rotary driver, illustrated as an axle; 2, a non-rotary hub loose upon the axle and forming, if desired, a journal-box for the axle; 3, a flange on the hub; 4, an annular rib projecting from flange 3 concentric with the axle; 5, an open friction-ring with its inner surface normally gripping the exterior of rib 4 and with its outer surface normally free of the surface of the surrounding part 11, but adapted when the ring is sprung open to make gripping frictional contact with a surrounding part; 6, the gap in the ring; 7, a forked lever pivoted in the gap of the ring, so that the rocking of the lever in either direction will tend to expand the ring, the arms of this lever straddling the axle; 8, a cam fast upon the axle within the fork of arm 7 and having such form as when turned either way to rock the forked lever and expand the friction-ring; 9, stops on cam 8 to limit the rotary motion of the cam relative to the lever; 10, a plate loose on the axle and forming a covering-plate for the mechanism between it and flange 3, plate 10 constituting the driven of the system and typifying any wheel or wheel part to which it is desired that motion be transmitted from driver 1, and 11 a friction-flange on plate 10, the same encircling friction-ring 5 and having a bore adapted to be frictionally engaged by the ring when the latter is expanded.

Assume shaft 1 to be the motor-driven axle of a motor-vehicle and assume plate 10 to be a part of one of the vehicle-wheels which are to be driven or one or a part of one of the transmitting-wheels from which such vehicle-wheels are to receive their motion, and assume hub 2 to be one of the fixed axle-boxes.

When the axle is stationary, then friction-ring 5 grips stationary rib 4 and is contracted, so as to be out of gripping contact with flange 11, the driven (represented by plate 10) being in such case quite free to turn relative to all other parts of the system. Under such conditions a motor-vehicle having its two driven wheels provided with our invention might coast down hill while the driving-axle was stationary. Now in Fig. 2 assume shaft 1 to turn in clockwise direction. The early motion of the shaft will obviously rock lever 7 and unclutch ring 5 from fixed rib 4 and clutch it to flange 11, thus frictionally locking the driven to the driver. Under these conditions in the motor-vehicle assumption the wheels will be driven with the axle, and this will obviously be the case with either direction of motion of the axle. Now while the driven 10 is thus turning with and at the speed of the driver 1 let it be assumed that conditions call for a superior advance of the driven—as, for instance, in the case of the outer wheel of a motor-vehicle turning a curve. In such case the superior advance due to the rolling of the driven will carry lever 7 ahead of its cam 8, whereby the friction-ring 5 becomes automatically released from flange 11 and clutched to rib 4, the driven thus being unclutched from the driver and left free in advance. Later when the speed of the driven becomes reduced below that of the driver then and then only the driven becomes again clutched to the driver and driven by it.

In the motor-vehicle case assume the vehicle running straight on a level, both drivens moving with and at the speed of the driver. On reaching a decline the drivens automatically release themselves from the driver and turn forward independent thereof, thus permitting the vehicle to coast. By reversing the motion of the drivers then the drivers become clutched to the drivens, the drivers in such case acting as a brake.

We claim as our invention—

1. In a device for transmitting rotary motion, the combination, substantially as set forth, of a rotary driver, a rotary driven, a friction-surface carried by the driven, a fixed friction-surface, a gripping device adapted to engage said two friction-surfaces alternatively and to normally engage said fixed friction-surfaces, and mechanism connecting said driver and gripping device and adapted by the turning of the driver in advance of the driven to release said gripping device from said fixed friction-surface and engage it with the friction-surface of the driven.

2. In a device for transmitting rotary motion, the combination, substantially as set forth, of a rotary driver, a fixed friction-surface disposed concentric thereto, a rotary driven mounted concentric to the driver, a friction-surface carried by said driven concentric to said fixed friction-surface, an open friction-ring normally gripping said fixed friction-surface and adapted to expand and release therefrom and engage the friction-surface of the driven, a lever connected with said friction-ring and adapted to expand the same, and mechanism upon the driver adapted to engage said lever and expand said ring when the driver turns in either direction in advance of the driven.

3. In a device for transmitting rotary motion, the combination, substantially as set forth, of a driving-shaft, a driven mounted loosely thereon, a friction-surface carried by the driven concentric with said shaft, a fixed friction-surface concentric with the friction-surface carried by said driven, an open friction-ring normally gripping said fixed friction-surface and adapted to expand and release therefrom and grip the friction-surface of the driven, a double cam on the shaft, and a lever pivoted at the gap of said friction-ring and having engagement with said cam.

WINFIELD S. ROGERS.
LEE S. CHADWICK.

Witnesses:
JOSEPH H. WASHBURN,
MYRA M. TOWLE.